United States Patent [19]

Kanda

[11] 4,419,826

[45] Dec. 13, 1983

[54] DIAL GAUGE WITH RELEASING MEANS

[75] Inventor: Yoshiro Kanda, Batohmachi, Japan

[73] Assignee: Mitutoyo Mfg. Co., Ltd., Tokyo, Japan

[21] Appl. No.: 310,679

[22] Filed: Oct. 13, 1981

[30] Foreign Application Priority Data

Oct. 23, 1980 [JP] Japan .............................. 55-151519

[51] Int. Cl.³ .............................................. G01B 3/22
[52] U.S. Cl. .............................................. 33/172 R
[58] Field of Search ......................... 33/172 R, 147 R; 354/269; 74/501

[56] References Cited

U.S. PATENT DOCUMENTS 2,591,725 4/1952 Schneebeli ........................ 33/172 R
3,200,728 8/1965 Karpf ................................. 354/269

FOREIGN PATENT DOCUMENTS 45032 11/1910 Austria ................................. 74/501
813463 9/1951 Fed. Rep. of Germany .... 33/172 R
1002811 11/1951 France .............................. 33/172 R
365583 7/1930 United Kingdom ................. 74/501
583382 12/1946 United Kingdom ................. 74/501

OTHER PUBLICATIONS

Starrett Cat., Lever Control Dial Gauge, L. S. Starrett Co., p. 34.

Primary Examiner—Harry N. Haroian
Attorney, Agent, or Firm—Flynn, Thiel, Boutell & Tanis

[57] ABSTRACT

In the dial gage with releasing means of the invention the end of the spindle opposite to the end having the measuring point mounted thereon projects from the stem of an inner frame and has a connection plate mounted thereto by means of a set screw. A tube comprising part of the releasing means is mounted at one end thereof to the connection plate, and a wire within this tube is used to exert pressure against the outer circumferential surface of the inner frame.

10 Claims, 2 Drawing Figures

DIAL GAUGE WITH RELEASING MEANS

BACKGROUND OF THE INVENTION

1. Field of the Invention

This invention concerns a dial gage (or indicator) and, more specifically, it relates to a measuring dial gage with releasing means capable of lifting or lowering a spindle.

2. Description of the Prior Art

Conventional dial gages, as individual separate units, usually have no releasing means for lifting or lowering a measuring spindle but such releasing means may sometimes be attached to such dial gages incorporated in limit gages or height gages. In such a dial gage releasing means is formed in an inner frame such that a rod attached to the leading end of a release wire is inserted into the inner frame, and the tip of this rod is engaged with measuring spindle within the inner frame. However, since such a structure requires additional space for the engagement, the size of the inner frame is increased as compared with that of the usual dial gage. Accordingly, the dial gage with releasing means involves a problem in that certain components of a general type dial gage connot be utilized. Furthermore, the aperture formed in the inner frame for the insertion of the release rod is undesirable since it requires corrosion-proofing or waterproofing measures. Since the releasing means is securely attached to the inner frame and cannot be detached therefrom, this leads to another disadvantage that operation of the measuring spindle is impossible other than by the actuation of the releasing means. Furthermore, the conventional structure referred to above requires a long assembly time and requires the provision of a particular mechanism within the inner frame for the engagement of the releasing means, thereby increasing the economic disadvantages on the whole and making handling inconvenient.

SUMMARY OF THE INVENTION

The object of this invention is to provide a dial gage provided with releasing means for raising and lowering the measuring spindle thereof, which gage requires no substantial additional fabrication to the inner frame for mounting the releasing means and is capable of reducing the size of the entire structure.

The foregoing object can be attained in accordance with this invention, wherein one of the release components, that is, one of the tubular sheath and the wire contained in the sheath, engages to a portion of a measuring spindle of a dial gage projecting from the inner frame, while the other of the release components abuts against the inner frame, thereby enabling mounting of the releasing means outside of the inner frame.

DETAILED DESCRIPTION OF THE PREFERRED EMBODIMENT

Figure 1:
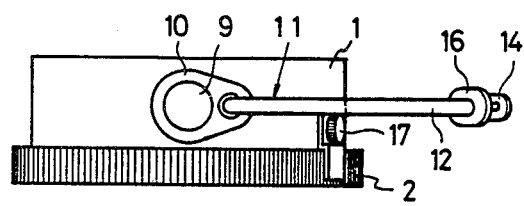
FIG. 1 is a top plan view of one embodiment of a dial gage with releasing means according to this invention.
Figure 2:
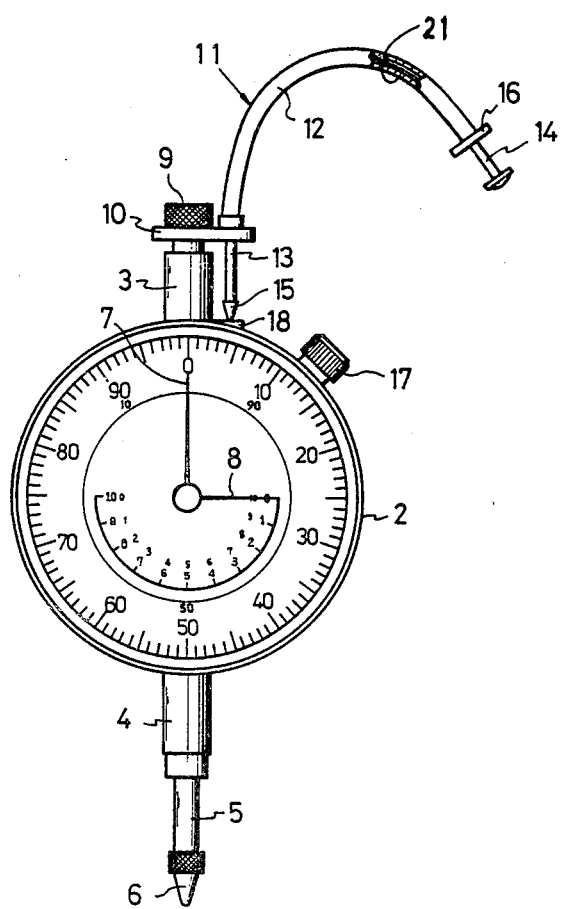
FIG. 2 is a front elevational view of the embodiment shown in FIG. 1.

In FIG. 1, a cylindrical inner frame or housing 1 for a dial gage is shown and an outer frame (or a bezel) 2 is rotatably mounted and fixed to the inner frame 1 at a predetermined rotational position by means of a clamp screw 17. In FIG. 2, there are shown stems 3, 4 integrally mounted on the inner frame 1, a measuring spindle 5 slidably disposed in the stems 3, 4, a measuring tip 6 attached to one end of the spindle 5 and pointers 7, 8 which are interlocked with the spindle 5 in the inner frame 1.

At the end of the spindle 5 that projects out of the inner frame 1 opposite the tip 6, there is detachably mounted one end of a connection plate 10 by means of a set screw 9. The leading end of a flexible tube (or sheath) 12 of a release or manipulating means 11 is threaded into the other end of the connection plate 10. A flexible wire 21 of the release 11 is slidably contained within the tube 12. This wire is integrally attached at its leading end to a rod 13 which abuts against the inner frame 1 as described below and is also integrally attached at its other end with a plunger rod 14 for effecting the manipulating operations.

The rod 13 projects from the leading end of the tube 12 toward the outer circumference of the inner frame 1 and the plunger rod 14 projects from the rear end of the tube 12.

A frictional head or tip portion 15 made of soft elastic material, such as rubber or synthetic resin, is attached to the end of the rod 13, and the tip of the engagement head 15 abuts against a flat portion 18 formed on the outer circumference of the inner frame 1. The flat portion 18 may be an integral part of the inner frame 1 which is formed by machine fabrication or a member which is prepared separately and is fixed to the inner frame 1 by adequate fixing methods such as screwing or welding.

The release 11 used herein is a general type releasing means in which the rod 14 is resiliently biased in the protruding direction. In the state where it is mounted as shown in FIG. 2, the engagement head 15 on the end of the rod 13 abuts against the outer circumferential surface of the inner frame 1. In the drawing, reference number 16 denotes an annular flange attached to the rear end of the tube 12.

The operation of the dial gage with releasing means having the foregoing construction is explained below.

In a state where the dial gage with releasing means is positioned by a holder (not shown) or the like placed on a surface plate, the flange 16 is held between the user's fingers and the rod 14 is pushed into the tube 12. The rod 13 thereby tends to project farther out of the leading end of the tube 12 because it is pushed by the wire (not shown) in the tube 12. However, since the frictional engagement head 15 at the tip end of the rod 13 abuts against the flat portion 18, the tube 12 is retracted relative to the wire, whereby the spindle 5 connected to the tube 12 by means of the connection plate 10 is displaced upwardly in FIG. 2.

With the dial gage in this state, an article to be measured is placed on the surface plate (not shown) at the position below the measuring tip 6.

Then, when the finger pressure on the rod 14 is released, the spindle 5 is displaced downwardly by means of a return spring (not shown) within inner frame 1 so that the measuring tip 6 abuts against the article to be measured. The movement of the measuring tip 6 is transmitted to and is indicated by corresponding movement of the pointers 7, 8, whereby the measurement of the thickness of the article is obtained.

According to the embodiment referred to above, since the leading end of the tube 12 of the release 11 is attached by means of the connection plate 10 to a portion of the spindle 5 of the dial gage, and the frictional engagement head 15, which is attached to the leading end of the wire of the release 11 by means of the rod 13, is abutted against the flat portion 18 of the inner frame 1, the provision of an insertion aperture for allowing the release 11 to enter the inner frame 1 and of additional space in the inner frame 1 for engagement of the release 11 and the spindle 5 as in the conventional structure are not necessary, whereby the structure can be decreased in size. As a result, common type inner frames can be used, that is, the dial gage with releasing means according to this invention can be constructed from a general type dial gage with no substantial modifications at all, whereby both the costs for the parts and assembling time can be decreased. Another advantage is that dust-proofing and drip-proofing structures indispensable in the conventional structure due to the provision of the insertion aperture are not necessary.

Further, since the release 11 is detachably mounted on the dial gage, the dial gage is convenient in that it can be used also as a normal gage by detaching the release 11 comprising the plate 10, rod 13, head 15, tube 12, the wire within the tube 12, the rod 14 and the flange 16.

Furthermore, since the connection plate 10 is mounted by the set screw 9 at the end of the spindle 5 opposite to the measuring tip 6, the leading end of the tube 12 is mounted to the connection plate 10 in the direction to the outer circumferential surface of the inner frame 1, and the frictional engagement head 15, which is attached to the tip of the rod 13 integrally connected to the leading end of the wire and projecting out of the leading end of the tube 12, abuts against the flat portion 18 on the outer circumferential surface of the inner frame 1, the release 11 can be mounted only at one position. In addition, since the set screw conventionally provided at the end of the spindle 5 can also be used as the set screw 9 for the plate 10 in this embodiment, no additional parts are required for the mounting of the release 11.

Furthermore, if the frictional engagement head 15 is made of soft elastic material in this embodiment, this provides the advantages of not damaging the outer circumferential surface of the inner frame 1 and of exerting an effective anti-slipping effect between the frictional engagement head 15 and the inner frame 1.

Although this invention has been described as above by way of the embodiment shown in the drawings, various other improvements and modification are also possible. For instance, although the frictional engagement head 15 attached by means of the rod 13 to the leading end of the wire abuts against the inner frame 1, and the tube 12 of the release means 11 is connected to the spindle 5 in this embodiment, this construction may be altered so that the tube 12 is attached to the inner frame 1 and the frictional engagement head 15 on the wire abuts against the connection plate 10 mounted on the spindle 5. That is, this invention can be achieved by engaging either one of the release components, i.e., the tube 12 or the wire contained in the tube 12, to the portion of the spindle 5 of the dial gage projecting from the inner frame 1 opposite the tip 6 while engaging the other of the release components with the inner frame 1.

What is claimed is:

1. In a dial indicator having release means, comprising an inner frame means, a spindle extending through said inner frame means and having opposite end portions projecting from opposite sides of said inner frame means, a contact point on one end portion of said spindle and adapted to contact a workpiece, a pointer coupled to said spindle for indicating the position of said contact point and an outer frame means mounted on said inner frame means, the improvement comprising wherein a connecting plate is detachably mounted on the other end portion of said spindle by means of a set screw, a release comprises an elongated tube and a wire means slidably movable longitudinally within and with respect to said tube, said tube being affixed to said connecting plate and said wire means abutting against the outer peripheral portion of said inner frame means, and said inner frame means comprises a cylindrical inner frame and said outer frame means is a bezel releasably fixedly mounted on said inner frame by means of a clamp screw.

2. A dial indicator as claimed in claim 1, wherein the end of said wire means abutting against said inner frame means has a frictionally engageable member connected thereto, said inner frame means has a flat wall portion and said frictionally engageable member abuts against said flat wall portion.

3. A dial indicator comprising:
a frame;
dial means mounted on said frame;
pointer means adapted to cooperate with said dial means to designate specific measured values;
a spindle extending through and out of opposite sides of said frame and mounted for sliding movement with respect to said frame, said spindle being coupled to said pointer means such that said measured values correspond in magnitude to the degree of displacement of said spindle from a selected initial position, said spindle having a measuring tip at a first end portion thereof which projects out of one side of said frame;
a connecting plate rigidly but detachably secured to a second end portion of said spindle which projects out of the other side of said frame;
a flexible elongated tube secured at one end thereof to said connecting plate;
a flexible wire disposed within said tube and extending lengthwise thereof;
rod means connected to said flexible wire adjacent said one end of said tube, said rod means extending beyond said one end of said tube through means defining a hole in said connecting plate and a free end of said rod means abuts against said frame; and
wire manipulation means connected to said flexible wire adjacent the other end of said tube and effective to cause relative movement of said wire with respect to said tube, whereby said spindle is displaced relative to said frame due to the action of said rod means on said frame.

4. A dial indicator as claimed in claim 3, wherein said frame has a flat planar portion formed thereon, which planar portion is perpendicular to and is engaged by said rod means.

5. A dial indicator as claimed in claim 4, wherein said rod means comprises an elongated rod and a tip portion made of a soft elastic material, which tip portion engages said flat portion of said frame.

6. A dial indicator as claimed in claim 3, wherein said wire manipulation means comprises an annular flange located at said other end of said tube, which flange is of enlarged diameter suitable for gripping by fingers, and a plunger rod connected to said flexible wire adjacent said other end of said tube.

7. A dial indicator as claimed in claim 3, further comprising a set screw having an enlarged head portion, which set screw is threadably secured to said second end portion of said spindle, said connecting plate being secured between said second end portion and said enlarged head portion of said screw, whereby upon removal of said set screw, said wire manipulation means comprising said connecting plate, said tube, said wire, and said rod means can be detached from said dial indicator.

8. A dial indicator, comprising:
   a substantially cylindrical housing having an outer peripheral surface;
   a bezel mounted on one side of said housing for arcuate movement about the central axis of said housing, a dial face inside said bezel and a bezel clamp for releasably securing said bezel against rotation with respect to said housing;
   an elongated spindle extending radially through said housing, said spindle being mounted for sliding movement with respect to said housing in a radial direction and having first and second end portions projecting radially from diametrically opposite sides of said housing;
   a contact point located at said first end portion of said spindle and adapted for engagement with a workpiece;
   a rotatable pointer disposed in front of said dial face and coupled to said spindle for being rotated in response to radial movement of said spindle with respect to said housing and being adapted for indicating the position of said contact point relative to said housing;
   a connecting plate releasably affixed to said second end portion of said spindle and extending laterally therefrom so that movement of said connecting plate toward or away from said housing effects corresponding radial sliding movement of said spindle with respect to said housing;
   a wire release comprising an elongated tube having an outer end and an inner end, a wire disposed inside said tube for relative longitudinal sliding movement with respect thereto, said wire having an inner end and an outer end, and means for effecting relative longitudinal sliding movement of said wire with respect to said tube, at least one of the inner end of said tube and said wire being affixed to said connecting plate at a position thereon laterally spaced from said spindle, the other of the inner end of said tube and said wire abutting against the outer peripheral surface of said housing so that when said means is actuated to cause longitudinal sliding movement of said wire with respect to said tube, said spindle is retracted away from the workpiece.

9. A dial indicator as claimed in claim 8 in which said outer peripheral surface of said housing has a substantially tangentially extending flat surface adjacent to said second end portion of said spindle, the inner end of said wire has a tip made of soft elastic material frictionally engaged with and abutting against said flat surface, and the inner end of said tube is affixed to said connecting plate.

10. A dial indicator as claimed in claim 9 in which said housing has first and second radially outwardly extending, tubular, guide stems on diametrically opposite sides thereof, said first and second end portions of said spindle slidably extending through and extending outwardly beyond the outer ends of said first and second guide stems, respectively and in which a set screw is provided for releasably securing said connecting plate to said second end portion of said spindle at a location outwardly of the outer end of said second guide stem, said connecting plate extending parallel with and being disposed radially outwardly of and in vertical alignment with said flat surface.

* * * * *